United States Patent
Dash et al.

(10) Patent No.: US 11,804,699 B2
(45) Date of Patent: Oct. 31, 2023

(54) INTERLOCKING BETWEEN ROM AND RACKING FEEDER MECHANISM FOR DRAWOUT MODULE

(71) Applicant: SCHNEIDER ELECTRIC INDIA PRIVATE LIMITED, New Delhi (IN)

(72) Inventors: Debasmita Dash, Mumbai (IN); Sanjeet Vishwakarma, Mumbai (IN)

(73) Assignee: Schneider Electric India Private Limited, New Delhi (IN)

( * ) Notice: Subject to any disclaimer, the term of this patent is extended or adjusted under 35 U.S.C. 154(b) by 197 days.

(21) Appl. No.: 17/308,465

(22) Filed: May 5, 2021

(65) Prior Publication Data
US 2022/0069551 A1    Mar. 3, 2022

(30) Foreign Application Priority Data
Aug. 28, 2020    (IN) .............................. 202021037153

(51) Int. Cl.
*H02B 11/133*    (2006.01)
*H02B 1/36*    (2006.01)

(52) U.S. Cl.
CPC ............. *H02B 11/133* (2013.01); *H02B 1/36* (2013.01)

(58) Field of Classification Search
CPC ........ H01H 31/00; H01H 31/04; H01H 31/06; E05C 3/042; E05C 17/04; E05C 19/06; H02B 11/133; H02B 11/02; H02B 11/00; H02B 11/173; H02B 11/127; H02B 11/12; H02B 11/20; H02B 11/22; H02B 1/00; H02B 1/015; H02B 1/36; H02B 1/052; H02B 1/0523; H02B 1/32; H02B 1/34; G06F 1/181

USPC ...................................... 200/50.21
See application file for complete search history.

(56) References Cited

U.S. PATENT DOCUMENTS

| | | | |
|---|---|---|---|
| 4,012,610 A | 3/1977 | Ericson et al. | |
| 4,761,521 A | 8/1988 | Beck et al. | |
| 6,038,892 A | 3/2000 | Schmitt | |
| 6,066,814 A | 3/2000 | Smith et al. | |
| 6,095,574 A | 8/2000 | Dean | |
| 6,244,891 B1 | 6/2001 | Robbins et al. | |
| 7,348,505 B2 * | 3/2008 | Kashyap | H02B 11/24 200/50.22 |
| 2011/0233034 A1 * | 9/2011 | Park | H02B 11/133 200/50.27 |

FOREIGN PATENT DOCUMENTS

CA    1106427 A    8/1981

* cited by examiner

*Primary Examiner* — Anthony R Jimenez
(74) *Attorney, Agent, or Firm* — Melissa M. Hayworth; E. Joseph Gess; Merchant & Gould P.C.

(57) ABSTRACT

An interlocking arrangement for switching devices for blocking the operation of the switching device when a feeder door is open, including a feeder assembly with an interlock and a racking screw interlock assembly. The feeder assembly includes a switching device mounted on a feeder base plate of the feeder assembly and mechanically connected with an interlock slider by a locking clutch cable. The racking screw interlock assembly is mounted to the feeder channel by an interlock base plate, the racking screw interlock assembly including an interlock base plate to accommodate the locking clutch cable. The interlock slider is slidably mounted on the baseplate by a plurality of step screws and slots provided on the base plate.

9 Claims, 6 Drawing Sheets

INTERLOCKING BETWEEN ROM AND RACKING FEEDER MECHANISM FOR DRAWOUT MODULE

This application claims the benefit of Serial No. 202021037153, filed 28 Aug. 2020 in India, and which application is incorporated herein by reference. To the extent appropriate, a claim of priority is made to the above disclosed application.

TECHNICAL FIELD OF THE INVENTION

The invention generally relates to an arrangement/integration, particularly for Switching Devices with external feeder. The present invention more particularly relates to a separate package of interlock system between direct operating handle with MCCB and external feeder to prevent unintentional racking operation in withdrawable type MCCB.

BACKGROUND OF THE INVENTION

The use of switching devices, conventionally known as Switchgear, is well known for making, breaking, regulating and to provide safety in a typical electrical distribution system. These devices are generally mounted inside a panel door for added safety of operator. Most often these switching devices are operated either from outside or by opening the enclosure or panel door. Usually molded case circuit breakers commonly known as MCCBs incorporate a mechanical switching by operating a linear knob. The existing rotary operating mechanisms provide leverage to operations of switching devices, particularly MCCBs reducing the strain and the energy of switching ON/OFF of such devices.

In practical usage, there are often requirements of safety interlock to prevent unintended operations which may take place either by accident or by misuse. To avoid such issues, Door sensor and Door interlock feature is given. The door sensor feature is used to block the device from switching on in Panel door open condition. Door interlock feature is given in ROM to lock the device with panel door in Switch ON condition so that user can't open the panel door. However, door defeat feature is given to unlock the door interlock in ON condition for maintenance purpose. Also at times there could be requirements to inhibit the operations of the operator/switching device for maintenance or for other safety reason. These are usually done by arrangements for Padlock and key lock. However, in withdrawable modules user opens the panel door for racking in/out operation for MCCBs. There is no provision to block the racking screw if user opens the door in ON condition by using defeat tool for maintenance. Also, there is no provision for blocking the device at OFF condition so that user will not switch on the device when racking rod is inside.

U.S. Pat. No. 4,761,521 generally relates to circuit breakers and, more particularly, to an improved draw out and interlock assembly for manually racking a low-voltage circuit breaker of the molded case type into and out of operative relationship with the panel board of distribution switchboard apparatus U.S. Pat. No. 6,066,814 relate to interlock for switchgear with a positional interlock bar that is operated by a levering-in block in the levering-in assembly and by a finger on the dummy element.

U.S. Pat. No. 4,012,610 relates to Draw out apparatus having improved trip interlock CA1106427A relates to Draw out switchgear assembly which can be disconnected from a shielded cable electric distribution system under energized cable conditions.

Also few examples of interlocks related to switchgear are described in U.S. Pat. Nos. 6,038,892, 6,095,574, 6,244,891 both mounted inside and outside the enclosure which provides safety interlocks at required positions.

However, in current scenario, there is no such arrangement for Door independent handle mechanism's. During contact closed condition of ROM, user can open the door by defeating the door interlock and get access to racking screw for racking in the Short Circuit Protection Device, SCPD. In draw out type SCPD modules, user has to open the door for racking out the unit in ARAMCO panels. The racking rod should be inserted only in OFF condition to ensure user safety from unintentional fault. it allow user to rack out or in operation of feeder only when MCCB is in OFF condition and ensure the safety of person from unintentional fault. There is a chance of accident when user opens the door in ON condition by using defeat tool and get access to insert the rod on racking screw. Thus, their remain a need for an arrangement which will prevent the user get access to insert racking rod in MCCB switch ON condition.

SUMMARY OF THE INVENTION

The following disclosure presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

The object of present invention is to overcome the problems of prior arts.

The Primary object of the present invention is to prevent the access of racking screw in withdraw-able type MCCB in switch ON and panel door open condition.

Another object of invention is to provide an interlock which ensures, operating handle is directly mechanically connected to the unit irrespective of door position.

One aspect of present invention is to provide an interlocking arrangement for Switching Devices for blocking the switching device in ON condition, comprising a feeder assembly with Interlock comprising of a feeder assembly and a Racking screw interlock assembly, wherein the feeder assembly comprises a Switching device adapted to be connected to a Feeder base plate of the feeder assembly and mechanically connected with an interlock slider (18) by means of a locking clutch cable; and a feeder channel upon which the Racking screw interlock assembly is fixedly mounted by means of an interlock base plate which is adapted to be mechanically connected to the feeder channel by means of plurality of fixing holes; and wherein the racking screw interlock assembly comprises of the interlock base plate adapted to accommodate the locking clutch cable and the interlock slider slidably mounted on the baseplate by means of combine function of plurality of step screws and slots provided on the base plate; wherein two step screws are fixedly positioned on the interlock base plate by means of slots and operably connected by a spring mechanism and the other step screw is positioned on the interlock slider to provide slight movement of slider; wherein Locking clutch cable and slider is assembled in such a way that user can not access the racking screw of the feeder when locking clutch cable is locked by the switching device.

One of the embodiments of present invention discloses Interlock base plate has three fixing holes for mounting on feeder channel.

Another embodiment of present invention discloses Feeder RHS plate has provision for mounting of auxiliary contacts.

Yet another embodiment of present invention relates to interlock base plate, this is designed to accommodate interlock slider and locking clutch cable. Interlock slider gets assembled in slot and gets fixed by Step Screws. Interlock slider moves left and right with help of these step screws and hence step screw is so designed that it guides and supports slider. The same step screw is also used to hold the spring in rest and tension condition. Cable mounting hole is used to locate locking clutch cable which provides mechanical link between the slider and switching devices (MCCB, Contactor, Fuse unit, SD etc.). Interlock base plate further comprises thumb-up shaped lever is designed to actuate locking clutch cable when user moves slider to access the racking screw of feeder.

Further embodiment of present invention discloses interlock slider which has slot to allow its movement in left and right to block and unblock the access of racking screw by slider lever. Two step screws are fixed in interlock base plate and one in interlock slider to provide slight movement of slider. Combination of slider & spring helps to maintain slider position in locked condition in default condition and restrict user to access the racking screw of feeder.

Yet another embodiment of present invention discloses that locking clutch cable and slider which are assembled in such way that user cannot access the racking screw of feeder when locking clutch cable is locked by MCCB.

It is further provided that Locking clutch cable has additional lever on another side which is connected to the device sensor (MCCB or any other electrical device) fixed on clutch cable mounting plate and it has two states i.e. locked (ZERO state) and unlocked position (ONE state).

Another embodiment of present invention discloses slider has slot (18c) to allow user to slide lever by tool for ease of operation.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF ACCOMPANYING DRAWINGS

The above and other aspects, features and advantages of the embodiments of the present disclosure will be more apparent in the following description taken in conjunction with the accompanying drawings, in which.

Figure 1:
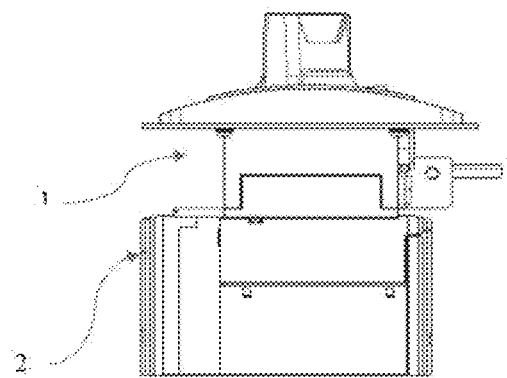
FIG. 1 illustrates the Complete assembly of ROM with MCCB according to one of the embodiment of present invention.
Figure 2:
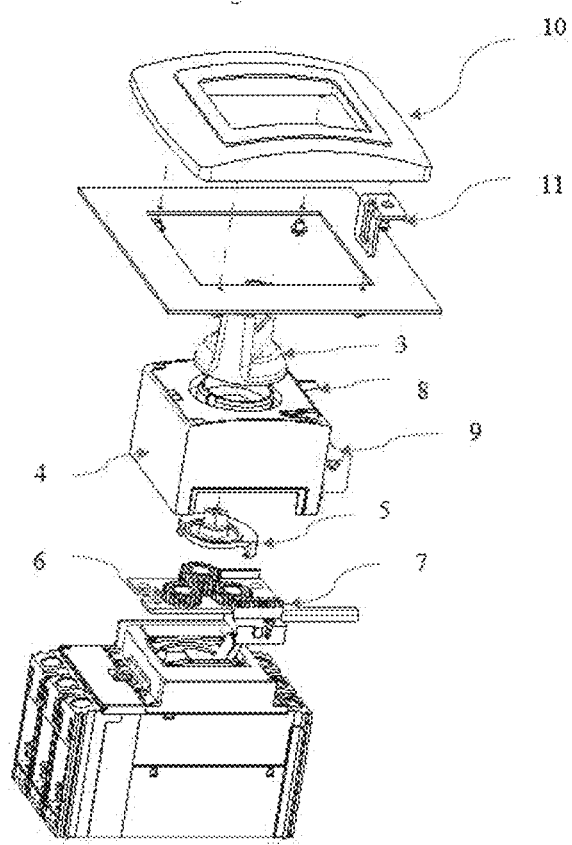
FIG. 2 illustrates Internal assembly of ROM with MCCB according to one of the embodiments of present invention.
Figure 3:
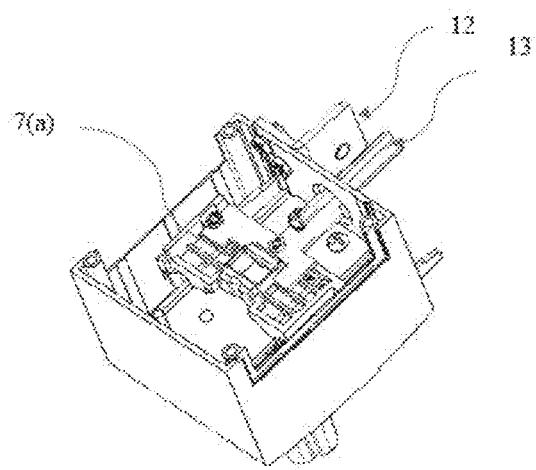
FIG. 3 illustrates Internal assembly of ROM as disclosed in an embodiment of present invention.

Persons skilled in the art will appreciate that elements in the figures are illustrated for simplicity and clarity and may not have been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION OF THE PRESENT INVENTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, a reference to "a component surface" includes a reference to one or more of such surfaces.

All terms (including technical and scientific terms) used herein have the same meaning as commonly understood by one of ordinary skill in the art to which various embodiments belong. Further, the meaning of terms or words used in the specification and the claims should not be limited to the literal or commonly employed sense but should be construed in accordance with the spirit of the disclosure to most properly describe the present disclosure.

The terminology used herein is for the purpose of describing particular various embodiments only and is not intended to be limiting of various embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. Also, Expressions such as "at least one of," when preceding a list of elements, modify the entire list of elements and do not modify the individual elements of the list.

The present disclosure will now be described more fully with reference to the accompanying drawings, in which various embodiments of the present disclosure are shown. The present disclosure may, however, be embodied in many different forms and should not be construed as being limited to the various embodiments set forth herein, rather, these various embodiments are provided so that this disclosure will be thorough and complete, and will fully convey the present disclosure. Furthermore, a detailed description of other parts will not be provided not to make the present disclosure unclear. Like reference numerals in the drawings refer to like elements throughout.

An interlocking arrangement for Switching Devices for blocking the access for racking operation when the feeder door is open, comprising a feeder assembly with Interlock (14) comprising of a feeder assembly and a Racking screw interlock assembly (15), wherein the feeder assembly comprises a Switching device (2, 14a) adapted to be connected to a Feeder RHS plate (14b) of the feeder assembly and mechanically connected with an interlock slider (18) by means of a locking clutch cable (17); and a feeder channel (14c) upon which the Racking screw interlock assembly (15) is fixedly mounted by means of an interlock base plate (16) which is adapted to be mechanically connected to the feeder channel by means of plurality of fixing holes; and wherein the racking screw interlock assembly (15) comprises of the interlock base plate (16) adapted to accommodate the locking clutch cable (17) and the interlock slider (18) slidably mounted on the baseplate by means of combine function of plurality of step screws (20) and slots (16e) provided on the base plate; wherein two step screws are fixedly positioned on the interlock base plate (16c) by means of slots (16e) and operably connected by a spring mechanism and the other step screw is positioned on the interlock slider (18a) to provide slight movement of slider (18); wherein Locking clutch cable (17) and slider (18) is assembled in such a way that user cannot access the racking screw (14d) of the feeder (21) when locking clutch cable (17) is locked by the switching device.

ROM (1) is an accessory of MCCB (2) which operates MCCB through rotary handle (3). ROM consists of an enclosure (4) with a rotary handle and gear train arrangement to drive the MCCB knob. The rotary handle is coupled with driving gear (5) which applies torque to the inside gear train arrangement and drives the pinion (6). The MCCB knob (6) goes into the rectangular slot 7(a) given on the rack (7) during installation of ROM on MCCB. The pinion engages with the rack and drives it by converting rotary motion to reciprocating and eventually drives the knob of the MCCB and making it operable. The Door Sensor feature (8) provides user safety in panel door open condition. When Panel door is open, User should not switch on the device. Door Sensor blocks the rack which drives the knob of MCCB. When door is closed the door sensor unblocks the rack and make the MCCB operable through ROM. The door interlock feature (9) is a spring loaded component which goes into Bezel plate (10) while closing the door in ON condition and also while switching the rack from OFF to ON in door closed condition which prevents the user from opening the door when MCCB is in Switch ON condition. In case of maintenance or contact weld condition, defeat feature with a special tool is provided where user has to defeat the interlock from front face to open the panel door. In draw out type SCPD modules user has to open the door for racking out the unit in ARAMCO panels. The racking rod should be inserted only in OFF condition. There is a chance of accident when user opens the door in ON condition by using defeat tool and get access to insert the rod on racking screw. The present innovation provides a mechanical arrangement where user will not get access to insert racking rod in MCCB switch ON condition.

Figure 4:
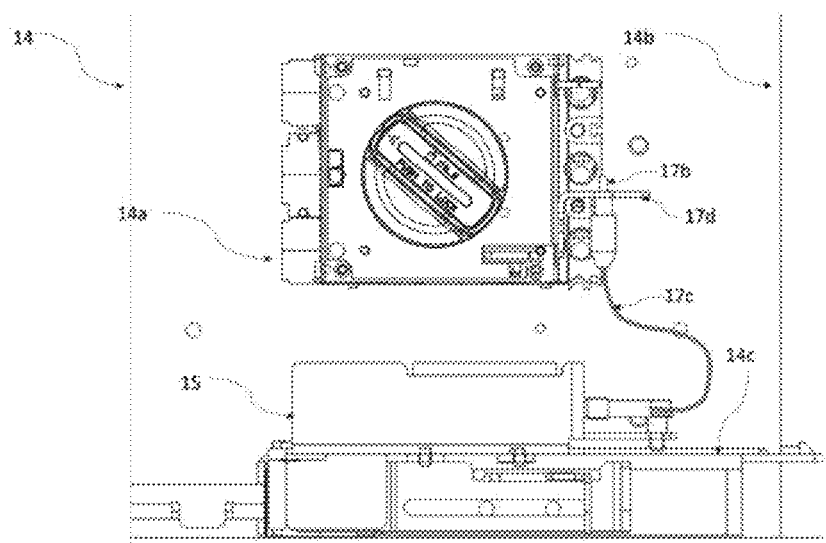
FIG. 4 illustrates Complete Feeder assembly with SCPD and Interlock Mechanism in SCPD OFF condition as disclosed in an embodiment of present invention.

FIG. 4 illustrates Feeder Assembly With Interlock (14). Representation of feeder and arrangement of MCCB (can be any device like Contactor, SD, Fuse Unit, MPCB etc) with feeder interlock is shown in FIG. 4. MCCB mounted on base plate of feeder has direct rotary operating mechanism on it. Racking screw interlock assembly (15) is mounted on feeder channel (14c) to allow and block the racking screw of feeder. Feeder RHS plate (14b) has provision for mounting of auxiliary contacts.

Figure 5:
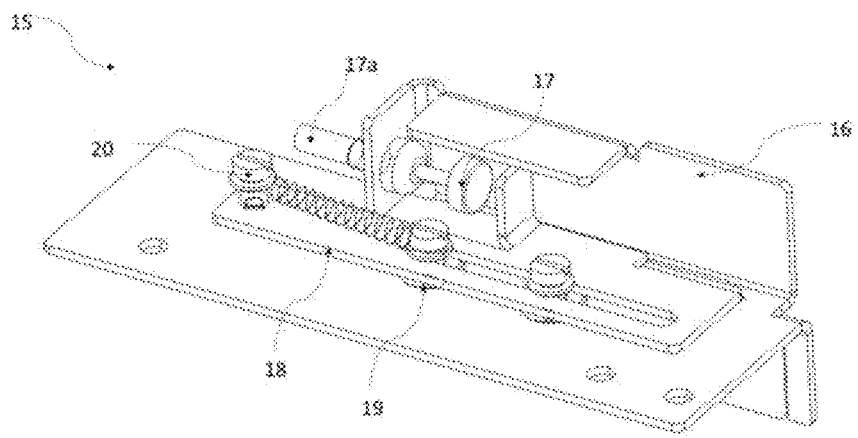
FIG. 5 illustrates Interlock mechanism assembly as disclosed in an embodiment of present invention.
Figure 6:
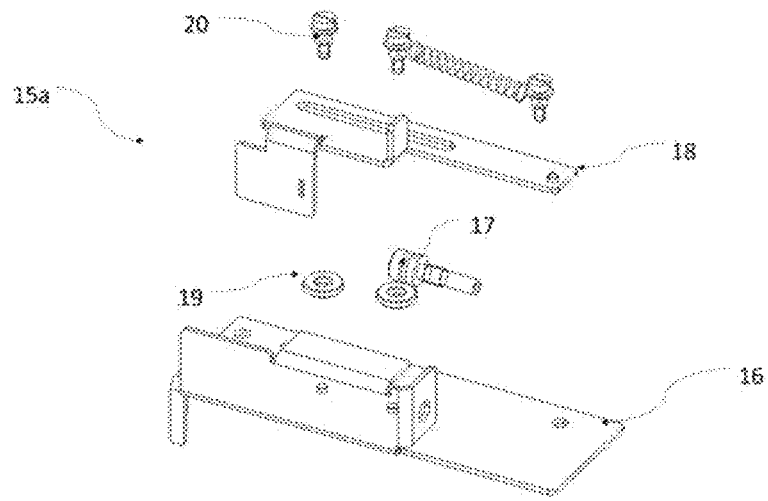
FIG. 6 illustrates Exploded view of Interlock mechanism assembly as disclosed in an embodiment of present invention.

Racking screw interlock assembly (15), as shown in FIGS. 5 and 6, consists of interlock base plate (16), locking clutch cable (17), interlock slider (18) with 3 nos. of step screws (20) & 2 nos. of roller (19). Interlock base plate has three fixing holes for mounting on feeder channel (14c).

Figure 7:
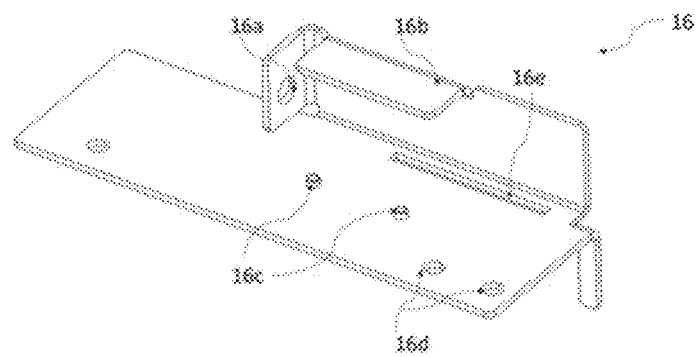
FIG. 7 illustrates Detailed view of Interlock Base plate as disclosed in an embodiment of present invention.

FIG. 7 shows detailed view of interlock base plate (16), this is designed to accommodate interlock slider (18) and locking clutch cable (17). Interlock slider gets assembled in slot (16e) and gets fixed by Step Screws (20). Interlock slider moves left and right with help of these step screws (20) and hence step screw is so designed that it guides and supports slider (18). The same step screw is also used to hold the spring in rest and tension condition. Cable mounting hole (16a) is used to locate locking clutch cable (17) which provides mechanical link between the slider (18) and switching devices (MCCB, Contactor, Fuse unit, SD etc.).

Figure 9:
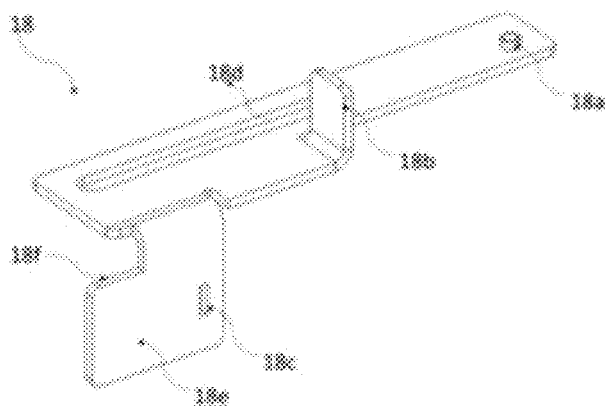
FIG. 9 illustrates Detailed view of Interlock slider as disclosed in an embodiment of present invention.

Interlock slider (18), referring FIG. 9, has slot (18d) to allow its movement in left and right to block and unblock the access of racking screw by slider lever (18e). Two step screws are fixed in interlock base plate (16c) and one in interlock slider (18a) to provide slight movement of slider (18). Combination of slider & spring helps to maintain slider (18) position in locked condition in default condition and restrict user to access the racking screw of feeder. For ease of operation slider has slot (18c) to allow user to slide lever by tool.

Figure 8:
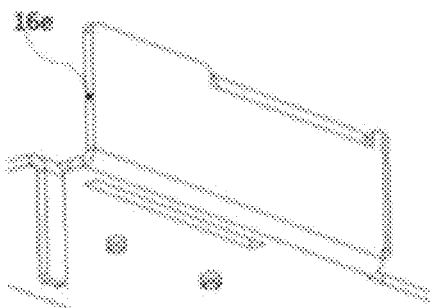
FIG. 8 illustrates Rear view of Interlock Base Plate as disclosed in an embodiment of present invention.

Thumb-up shaped lever (18b), referring FIG. 8, is designed to actuate locking clutch cable (17) when user moves slider (18) to access the racking screw of feeder.

Locking clutch cable (17) and slider (18) is assembled in such a way that user cannot access the racking screw of feeder when locking clutch cable is locked by MCCB. Locking clutch cable (17) has additional lever (17b) on another side which is connected to the device sensor (MCCB or any other electrical device) fixed on clutch cable mounting plate (12) (arrangement shown in bracket assembly-17d) and it has two states i.e. locked (ZERO state) and unlocked position (ONE state).

Figure 10:
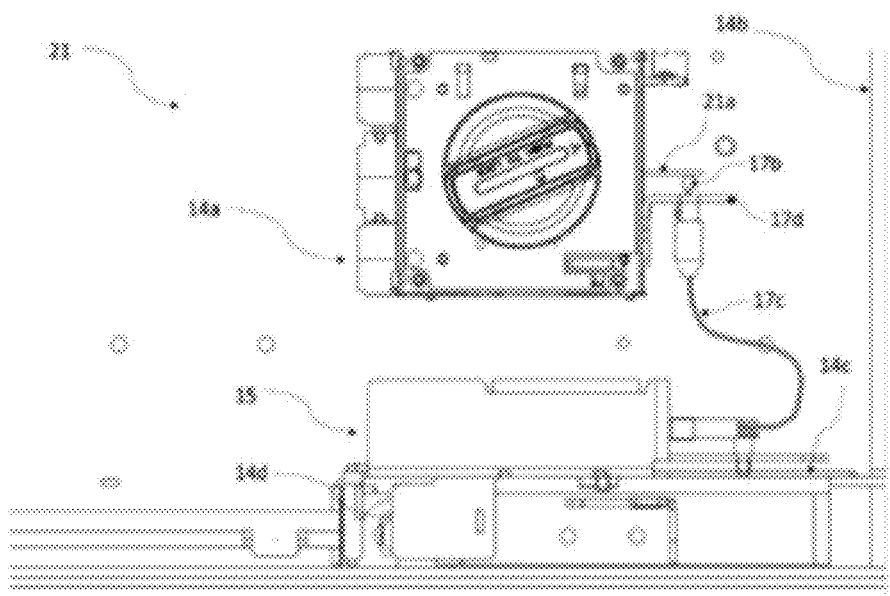
FIG. 10 illustrates Complete assembly with SCPD in ON Condition as disclosed in an embodiment of present invention.

FIG. 10 shows assembly of feeder (21), racking screw interlock assembly and racking screw (14d) of feeder. Whole mechanism works in coordination of MCCB operation and interlock mechanism through locking clutch cable. FIG. 4 shows whole assembly (14) with MCCB (14a) in OFF condition, when interlock slider (18) of interlock mechanism (15) rest in default blocked position due to spring force. If user wants to rack out feeder, one has to access the racking screw (14d) by sliding interlock slider (18) with tool. There is a slot (18c) made in slider lever (18e) of interlock slider (18) for insertion of tool. This interlock slider moves toward right and press locking clutch cable (17). Since MCCB is in OFF condition, clutch cable lever (17b) will move upward through flexible cord (17c) and allow user to access racking screw (14d) of feeder.

Figure 11:
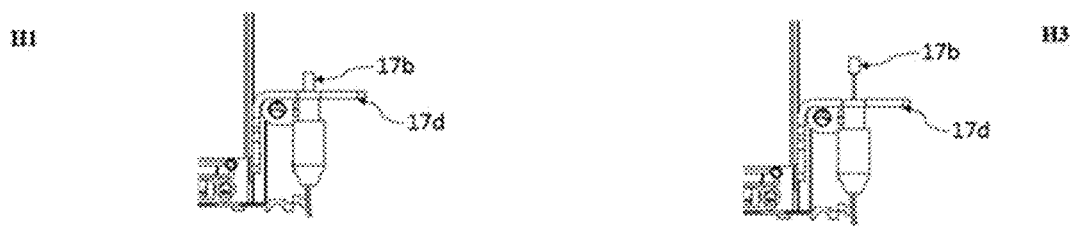
FIG. 11 illustrates detailed view of mechanism slider and clutch cable position when SCPD is OFF as disclosed in an embodiment of present invention.
Figure 11:
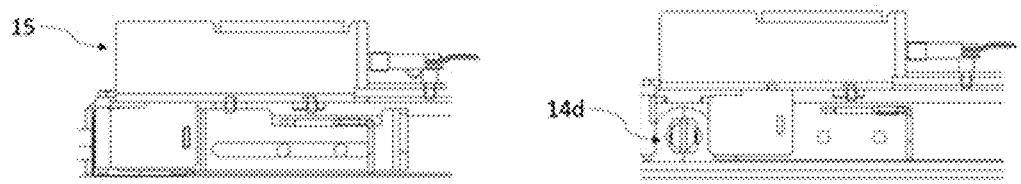

Assembly operation in MCCB OFF condition is shown in FIG. 11. Reference sign H1 & H3 is for clutch cable lever position in de-pressed and pressed position respectively. Reference sign H2 & H4 is for interlock slider position in blocked and unblocked position respectively.

Condition 1: When MCCB is OFF, then its lever sensor (13) (arrangement shown-21a in FIG. 10) will be in rest position inside the SCPD housing itself. In such case interlock mechanism (15) and locking clutch cable (17) will be in ZERO state (H1) and racking screw (14d) will be blocked by slider (18,18e) shown in H2.

Condition 2: To access the racking screw (14d) of feeder for racking out feeder, user has to slide the spring loaded interlock slider (18) by inserting tool in slider slot (18c) and thereby pressing locking clutch cable (17) located at mounting hole (16a) through thumb-up shaped lever (18b). Thereafter, clutch cable (17) attains the ONE state and pop out from the cable through (17c) shown in H3 and allow user to insert racking handle in racking screw of the feeder shown in H4.

While user rack in/out feeder, slider lever (18e) and clutch cable lever (17b) will remain in ONE state. As soon as user removes racking handle, slider (18) and clutch cable (17b) will reset to ZERO state and slider lever (18e) will block the racking screw.

Figure 12:
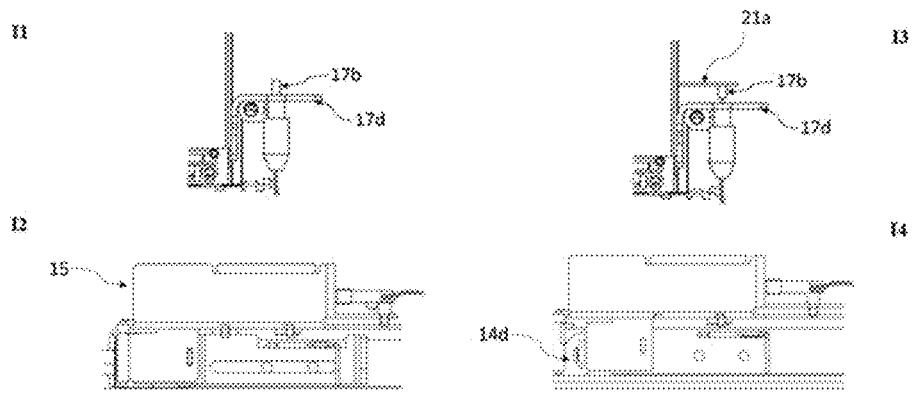
FIG. 12 illustrates detailed view of mechanism slider and clutch cable position when SCPD is ON as disclosed in an embodiment of present invention.

In FIG. 12, reference sign I1 and I2 is shown for reset/ZERO state of clutch cable lever (17b) & interlock mechanism (15) and reference sign I3 & I4 is shown for the position of clutch cable lever (17b) and interlock mechanism slider (15, 18e) when MCCB is ON.

Condition 3: When MCCB (14a) is ON and user wants to rack out/in the feeder (14) by accessing racking screw (14d), user has to slide the slider lever (18e) by tool. Since MCCB is ON, lever sensor (13) will move out of electrical device (14a) enclosure and will block the clutch cable lever (17b) to attain ONE state. Hence, user cannot press the locking clutch cable (17) through thumb-up shaped lever (18b) and restrict the slider (18, 18e) movement. Thereby, racking screw (14d) of feeder (14, 21) cannot be accessed.

Interlock Slider is designed to move smoothly along the slot (18d) and it rest on rollers (19) with maintaining sufficient gap with less friction. In addition to above, slider has cut profile (18f) which helps user to slide the slider (18) without disturbing its assembly in interlock base plate (16).

Figure 13:
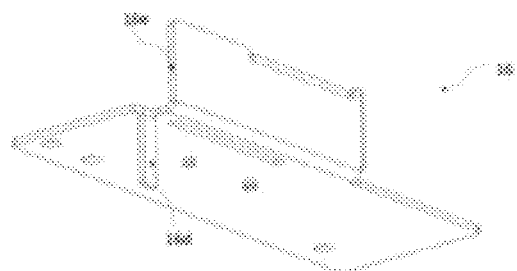
FIG. 13 illustrates view of Interlock Base plate having additional features as disclosed in an embodiment of present invention.

Interlock base plate (16) has additional flange (16e) (shown in FIG. 13) to cover whole assembly and restrict the unauthorized access of user to disturb the internal mechanism of interlock (15). It also has another flange (16d) exact opposite to above flange which helps to maintain the slider (18) in rest/blocked/ZERO position even spring will not be in free length position.

This flange (16d) also help to restrict insertion of racking screw when user moves slider (18) even in MCCB ON condition due to little gap in between thumb shaped lever (18b) and clutch cable (17).

Figure 14:
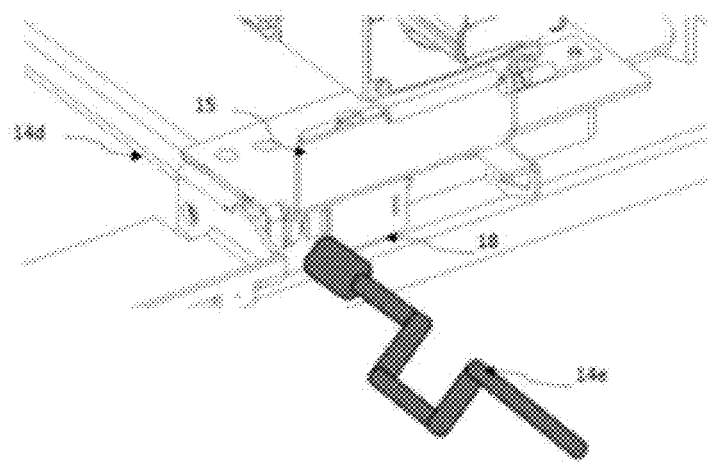
FIG. 14 illustrates detailed arrangement of racking screw (14d) which is accessible by racking handle (14e) when SCPD device in OFF condition.

FIG. 14 shows detailed arrangement of racking screw (14d) which is accessible by racking handle (14e) when SCPD device in OFF condition.

Some of the non-limiting advantage of present invention is as follows:
1. Safety interlock
2. Highly reliable
3. The Novelty lies in the arrangement of Racking interlock assembly in ROM to block unintended operation by user when panel door is open and switching contacts are closed.
4. The clutch cable arrangement can be used in feeder by many devices like MCCB, Contactor, Switch Fuse unit, SD etc. for safety interlocks.
5. The combine arrangement provides an idea for mechanical interlocking between handle and switching devices to ensure User safety as well as reciprocating intended command.

We claim:

1. An arrangement for switching devices with a feeder, comprising
 a switching device connected to a feeder base plate and mechanically connected with an interlock slider by means of a locking clutch cable;
 a feeder channel upon which a racking screw interlock assembly is fixedly mounted by means of an interlock base plate which is mechanically connected to the feeder channel by means of a plurality of fixing holes;
 the racking screw interlock assembly to permit blocking of a racking screw of the feeder, the interlock assembly comprising the interlock base plate accommodating the locking clutch cable and the interlock slider slidably mounted on the interlock base plate by a plurality of step screws and slots provided on the interlock base plate; wherein two of the plurality of step screws are fixedly positioned on the interlock base plate by means of the slots and operably connected by a spring mechanism and one of the plurality of step screws is positioned on the interlock slider to provide movement of the slider;
 wherein the slider comprises a slot to permit movement of the slider left and right to block and unblock access to the racking screw by a slider lever;
 wherein the locking clutch cable and the slider are assembled so a user cannot access the racking screw of the feeder when the locking clutch cable is locked by the switching device; and
 wherein the interlock base plate comprises a cable mounting hole to locate the locking clutch cable for providing a mechanical link between the slider and the switching devices.

2. The arrangement of claim 1, wherein auxiliary contacts are mounted on the feeder base plate.

3. The arrangement of claim 1, wherein the interlock base plate has an additional flange to cover the interlock, thereby restricting unauthorized access of the user, and another flange located opposite to the additional flange to maintain the slider in a rest/blocked/ZERO position.

4. The arrangement of claim 1, wherein a racking screw is accessible by a racking handle in OFF condition.

5. The arrangement of claim 1, wherein the switching device is selected from the group of MCCB, contactor, and switch fuse unit.

6. The arrangement of claim 1, wherein the interlock base plate comprises a thumb-up shaped lever to actuate the locking clutch cable when the user moves the slider to access the racking screw of the feeder.

7. The arrangement of claim 3, wherein the locking clutch cable has an additional lever which is operably connected to a device sensor fixed on a clutch cable mounting plate.

8. The arrangement of claim 1, wherein the slider comprises a cut profile for the user to slide the slider without disturbing its assembly in the interlock base plate.

9. The arrangement of claim 8, wherein the slider rests on a plurality of rollers maintaining a gap providing less friction.

\* \* \* \* \*